United States Patent [19]
Ostler et al.

[11] Patent Number: 6,112,839
[45] Date of Patent: Sep. 5, 2000

[54] AUTOMATIC REMOTE AUXILIARY IMPLEMENT CONTROL

[75] Inventors: William L. Ostler, Fargo; Curtis A. Halgrimson, Valley City, both of N. Dak.

[73] Assignee: Case Corporation, Racine, Wis.

[21] Appl. No.: 09/386,240

[22] Filed: Aug. 31, 1999

Related U.S. Application Data

[63] Continuation-in-part of application No. 09/027,763, Feb. 23, 1998, which is a continuation-in-part of application No. 08/853,078, May 8, 1997, Pat. No. 5,887,669.

[51] Int. Cl.⁷ .................................................. B60K 17/28
[52] U.S. Cl. .............................................. 180/53.4; 172/2
[58] Field of Search ................................ 180/534; 172/2

[56] References Cited

U.S. PATENT DOCUMENTS

| | | | |
|---|---|---|---|
| 2,629,306 | 2/1953 | Rusconi | 97/50 |
| 3,026,638 | 3/1962 | Hayner et al. | 37/156 |
| 3,117,632 | 1/1964 | Caggiano, Jr. | 172/5 |
| 4,013,875 | 3/1977 | McGlynn | 235/150.2 |
| 4,040,497 | 8/1977 | Thomas | 180/53.4 |
| 4,047,587 | 9/1977 | Anstey | 180/53.1 |
| 4,170,168 | 10/1979 | Jenkins | 91/522 |
| 4,173,258 | 11/1979 | Boulais et al. | 172/4.5 |
| 4,376,298 | 3/1983 | Sokol et al. | 364/551 |
| 4,413,684 | 11/1983 | Duncklee | 172/4.5 |
| 4,518,043 | 5/1985 | Anderson et al. | 172/6 |
| 4,637,474 | 1/1987 | Leonard | 172/7 |
| 4,646,620 | 3/1987 | Buchl | 91/1 |
| 4,715,012 | 12/1987 | Mueller, Jr. | 364/900 |
| 4,744,218 | 5/1988 | Edwards et al. | 60/368 |
| 4,745,744 | 5/1988 | Cherry et al. | 60/368 |
| 4,811,561 | 3/1989 | Edwards et al. | 60/368 |
| 4,881,371 | 11/1989 | Haeder et al. | 60/431 |
| 4,898,333 | 2/1990 | Kime et al. | 180/53.4 |
| 4,914,593 | 4/1990 | Middleton et al. | 364/424.07 |
| 4,918,608 | 4/1990 | Middleton et al. | 364/424.07 |
| 4,924,374 | 5/1990 | Middleton et al. | 364/167.01 |
| 4,949,805 | 8/1990 | Mather et al. | 180/333 |
| 5,174,115 | 12/1992 | Jacobson et al. | 60/484 |
| 5,182,908 | 2/1993 | Devier et al. | 60/420 |
| 5,184,293 | 2/1993 | Middleton et al. | 364/167.01 |
| 5,190,111 | 3/1993 | Young et al. | 172/7 |
| 5,235,511 | 8/1993 | Middleton et al. | 364/424.07 |
| 5,291,407 | 3/1994 | Young et al. | 364/424.07 |
| 5,332,053 | 7/1994 | Vachon | 180/53.4 |
| 5,375,663 | 12/1994 | Teach | 172/4.5 |
| 5,434,785 | 7/1995 | Myeong-hün et al. | 364/424.07 |
| 5,479,992 | 1/1996 | Bassett | 172/4 |
| 5,538,084 | 7/1996 | Nakayama et al. | 172/4.5 |
| 5,558,163 | 9/1996 | Hollstein | 172/2 |

(List continued on next page.)

OTHER PUBLICATIONS

Scraper Operation Recommendations 8000/8000T and 9000 Series Tractors; John Deere Publication [Date Unknown].
Laserplane® Agricultural Grade Control Systems—Applying Technology To Solve Down To Earth Problems; Spectra–Physics Laserplane, Inc.; Sep. 1995.
Spectra Precision Hits The Mark Again; Spectra Precision Laserplane Advertisement [Date Unknown].

*Primary Examiner*—Kenneth R. Rice
*Attorney, Agent, or Firm*—Foley & Lardner

[57] ABSTRACT

An auxiliary hydraulic system for a work vehicle which can be coupled to an auxiliary implement. The implement includes a hydraulic actuator and a sensor for generating a feedback signal to an implement controller, which in turn generates an automatic command signal. The system includes a fluid source, a coupler for fluidly coupling to the actuator, a control valve fluidly coupled to the source and the coupler to regulate the fluid flow between the source and the actuator in response to a valve command signal, an input device for generating a manual command signal, and a mode device for generating a mode signal. The system also includes an auxiliary control unit operable in first and second modes in response to the mode signal, which generates the valve command signal based on the manual command signal and the automatic control signal when operating in the first and second modes, respectively. The valve command signal is applied to the valve.

28 Claims, 3 Drawing Sheets

U.S. PATENT DOCUMENTS

| | | | |
|---|---|---|---|
| 5,560,431 | 10/1996 | Stratton | 172/2 |
| 5,590,731 | 1/1997 | Jacobson | 180/53.4 |
| 5,653,292 | 8/1997 | Ptacek et al. | 172/4 |
| 5,685,377 | 11/1997 | Arstein et al. | 172/2 |
| 5,768,973 | 6/1998 | Cochran | 91/516 |
| 5,810,095 | 9/1998 | Orbach et al. | 172/2 |
| 5,887,669 | 3/1999 | Ostler et al. | 180/53.4 |
| 5,899,279 | 5/1999 | Bennett et al. | 172/7 |
| 5,915,313 | 6/1999 | Bender et al. | 111/178 |
| 5,918,195 | 6/1999 | Halgrimson et al. | 702/94 |
| 5,924,371 | 7/1999 | Flamme et al. | 111/177 |

AUTOMATIC REMOTE AUXILIARY IMPLEMENT CONTROL

CROSS-REFERENCE TO RELATED APPLICATIONS

This application is a continuation-in-part of application Ser. No. 09/027,763, entitled "CONTROL LEVER ASSEMBLY", filed Feb. 23, 1998, which is itself a continuation-in-part of application Ser. No. 08/853,078, entitled "AUXILIARY HYDRAULIC CONTROL SYSTEM", filed May 8, 1997, now issued as U.S. Pat. No. 5,887,669.

FIELD OF THE INVENTION

The invention relates generally to auxiliary hydraulic systems for work vehicles. In particular, the invention relates to an auxiliary hydraulic system including an auxiliary valve for supplying flows of hydraulic fluid to an auxiliary implement coupled to the vehicle, wherein the auxiliary valve can be automatically and remotely controlled in response to a feedback signal from the implement.

BACKGROUND OF THE INVENTION

Work vehicles such as agricultural tractors or construction vehicles are often equipped with auxiliary hydraulic systems for supplying hydraulic fluid from the vehicle hydraulic pump to equipment or attachments coupled to the work vehicle. For example, U.S. Pat. No. 5,887,669 discloses such an auxiliary hydraulic control system including a number (e.g., 5) of proportional valves for controlling the hydraulic fluid flow to an equal number of attachments. Each of the proportional valves is capable of supplying fluid to an attachment at a "feathered" flow rate (e.g., proportional control) as commanded by the vehicle operator using a valve control lever. Each of the valves can also be operated as an ON/OFF valve to turn on or turn off the hydraulic fluid flow. The '669 patent is commonly assigned with the present application, and is incorporated by reference herein in its entirety.

When an auxiliary hydraulic system as in the '669 patent is coupled to an hydraulically-powered implement such as a scraper equipped with hydraulic cylinders for raising and lowering a scraper blade, the operator often must manually actuate the command devices for the auxiliary hydraulic system, such as the auxiliary valve control lever, to control the operation of the scraper. Where more than one scraper is involved, the operator must simultaneously manipulate multiple control levers. This manual operation requires a high level of skill, can produce inaccurate results even with a skilled operator, causes a relatively high degree of wear and tear on the hydraulic system, and can be relatively unproductive.

Some implements driven by on-board hydraulic actuators such as hydraulic cylinders or motors have on-board proportional valves which provide a proportional fluid flow to the actuators under control of an implement controller. For example, scrapers can include a scraper body having an earth-contacting blade attached thereto, on-board hydraulic actuators (cylinders) for raising and lowering the scraper body to change the vertical location of the blade with respect to the ground, proportional valves for providing a flow of hydraulic fluid to the actuators, a laser for sensing the contours of the land over which the scraper travels, and a controller for reading the laser data and for determining control signals based on the laser data and operator-entered grade and elevation data which are then applied to the proportional valves to raise and lower the blade. When such a scraper is pulled by a work vehicle equipped with an auxiliary hydraulic system capable of supplying proportional flows, the valves in both the vehicle and scraper become redundant.

Accordingly, it would be desirable to provide an automatic control system for an hydraulically-powered implement coupled to an auxiliary hydraulic system of a work vehicle to provide better control of the implement, simplified use, easier setup, less wear and tear on the auxiliary hydraulic system of the vehicle, improved productivity and lower total system cost to the customer. It would also be desirable to provide an auxiliary hydraulic system wherein a remote valve can be automatically and remotely controlled in response to a signal from the implement. It would be desirable to provide an auxiliary hydraulic system wherein multiple auxiliary valves are automatically and remotely controlled by multiple implements coupled to the vehicle. The implement(s) would use ("borrow") the valve(s) which are already part of the vehicle's auxiliary hydraulic system, and the implement itself would not need to be equipped with these valves, significantly decreasing costs.

It would further be desirable to provide a switch on a control console mounted in the vehicle cab which would allow the operator to enable and disable the automatic and remote control by the implement. It would be desirable to provide such an auxiliary hydraulic control system configured to ignore the external signal provided by the implement in the event that the operator moves the auxiliary control lever located in the cab, thereby giving the operator the capability of overriding the automatic and remote auxiliary control. Further, it would be desirable to provide such an auxiliary hydraulic control system configured to ignore the external control signals provided by the implement whenever the vehicle is stationary. In addition, whenever the implement is providing the control signals for the auxiliary hydraulic system of the vehicle (i.e., as opposed to when the cab-mounted auxiliary control levers provide the control signals), it would be desirable to provide a cab-mounted display which provides visible indicia (e.g., "AUTO") to the vehicle operator to inform the operator that the automatic and remote auxiliary control is activated.

SUMMARY OF THE INVENTION

The invention integrates the auxiliary hydraulic system of a work vehicle with one or more implement controllers to provide a control system for one or more implements that functions more efficiently with less operator interfacing than with current systems. The implement controllers are configured to generate feedback signals to the controller of the auxiliary hydraulic system to request fluid flow from a remote section of the hydraulic system to adjust the implement position. The auxiliary hydraulic system responds to the fluid flow request by providing flow through the corresponding remote section to position the implement, thus providing an automatic mode of operation to the operator on the basis of the feedback signals.

The controller of the auxiliary hydraulic system is configured to receive a control signal generated by an implement controller for an implement coupled to the vehicle, and to control the auxiliary flow valves in response thereto. The implement can be, for example, a scraper with a movable blade. The scraper's controller generates the control signal for the auxiliary hydraulic system in response to laser data, operator-entered grade and elevation data, and feedback data from the scraper's blade hydraulic cylinders. In this way, the scraper controller can control the vehicle auxiliary hydraulic valves. The control signal for the auxiliary hydraulic system can be an analog signal, or a digital signal communicated via a data bus. A switch provided on a control console in the cab allows the operator to enable and disable the automatic and remote control of the auxiliary hydraulic system. In this system, the hydraulic valves on the scraper can advantageously be eliminated.

As disclosed herein, the vehicle's auxiliary hydraulic system ignores or overrides the remote control signal generated by the implement controller in the event any operator movement of the control lever for the auxiliary valve is detected. Thus, an operator sitting in the cab can override the automatic remote control of the auxiliary valve simply by moving the auxiliary control lever. In the example where the implement is a scraper, movement of the scraper body which would otherwise occur due to changes in the signals from the laser can be overridden by the operator simply by moving the auxiliary control lever located in the cab of the vehicle.

Also as disclosed herein, the auxiliary hydraulic system ignores the remote control signal generated by the implement controller when the vehicle is stationary. By ignoring the remote control signal, inadvertent movement of the implement when the vehicle is stationary is prevented. For example, if a scraper is attached to a stopped tractor, the scraper's controller will be unable to generate a control signal which affects the flow to the scraper's hydraulic actuator from the auxiliary hydraulic system, and movement of the scraper is prevented—even if a force is applied to the scraper such that the laser data would otherwise cause scraper movement. Then, the scraper can be controlled only by actuating the lever. Wheel or transmission speed, neutral gear engagement, transmission clutch pedal position, ground speed radar, etc. can be used to detect when the vehicle is stopped.

Also as disclosed herein, an electronic display provides the operator with visual indicia when the implement is remotely controlling the auxiliary valves. The display shows which auxiliary valves are on and whether the valves are being controlled locally by the control levers in the cab or remotely by the implement. For example, assume the controller for the auxiliary hydraulic system has only two analog inputs for receiving analog control signals from two scrapers. Then, assume that an operator enables automatic and remote auxiliary control via a cab-mounted switch. In this situation, an exemplary display of "1 - 3 - -" indicates that the first and third auxiliary valves are currently on, and an "AUTO" indicia associated with the icon of an AUX cylinder indicates that the first and the third auxiliary hydraulic valves are being remotely controlled by the implement in the automatic mode.

One embodiment of the invention provides an auxiliary hydraulic system for a work vehicle. The vehicle is configured to be coupled to an auxiliary implement including a hydraulic actuator and a feedback sensor for generating a feedback signal to an implement controller configured to generate an automatic command signal. The system includes a source of pressurized hydraulic fluid, a fluid coupler configured to be fluidly coupled to the actuator, an electro-hydraulic control valve fluidly coupled to the fluid source and the fluid coupler for regulating the flow of fluid between the fluid source and the actuator in response to a valve command signal, an input device for generating a manual command signal, and a mode device for generating a mode signal. The system also includes an auxiliary control unit coupled to the control valve, input device, mode device and implement controller, which operates in first and second modes in response to the mode signal, generates the valve command signal based on the manual command signal when operating in the first mode and based upon the automatic control signal when operating in the second mode, and applies the valve command signal to the valve.

Another embodiment of the invention provides a laser-guided scraper control system for a vehicle which can be coupled to a scraper with a hydraulic cylinder for raising and lowering a blade and a sensor for generating a feedback signal representing positions of the blade. The system includes a scraper controller for receiving the feedback signal and for generating an automatic command signal at least partly in response thereto, and an auxiliary hydraulic system with a source of hydraulic fluid, a fluid coupler which can be fluidly coupled to the blade cylinder, a control valve for regulating the flow between the source and the blade cylinder in response to a valve command signal, an input device for generating a manual command signal, a mode device for generating a mode signal, and an auxiliary control unit operable in first and second modes in response to the mode signal, generates the valve command signal based on the manual command signal when operating in the first mode and based upon the automatic control signal in the second mode, and applies the valve command signal to the control valve.

Another embodiment of the invention provides an auxiliary hydraulic system for a work vehicle configured to be coupled to an auxiliary implement having a hydraulic actuator and a sensor for generating a feedback signal. The system includes a hydraulic fluid source, a coupler configured to be fluidly coupled to the actuator, a control valve fluidly coupled to the source and the coupler for regulating the fluid flow between the source and the actuator in response to a valve command signal, an input device for generating a manual command signal, and an auxiliary control unit which operates in first and second modes to generate the valve command signal, and also applies the valve command signal to the control valve. The valve command signal is based upon the manual command signal in the first mode and at least partly on the feedback signal when operating in the second mode.

BRIEF DESCRIPTION OF THE DRAWINGS

The present invention will become more fully understood from the following detailed description, taken in conjunction with the accompanying drawings, wherein like reference numerals refer to like parts, in which.

DESCRIPTION OF THE PREFERRED EMBODIMENTS

Figure 1:
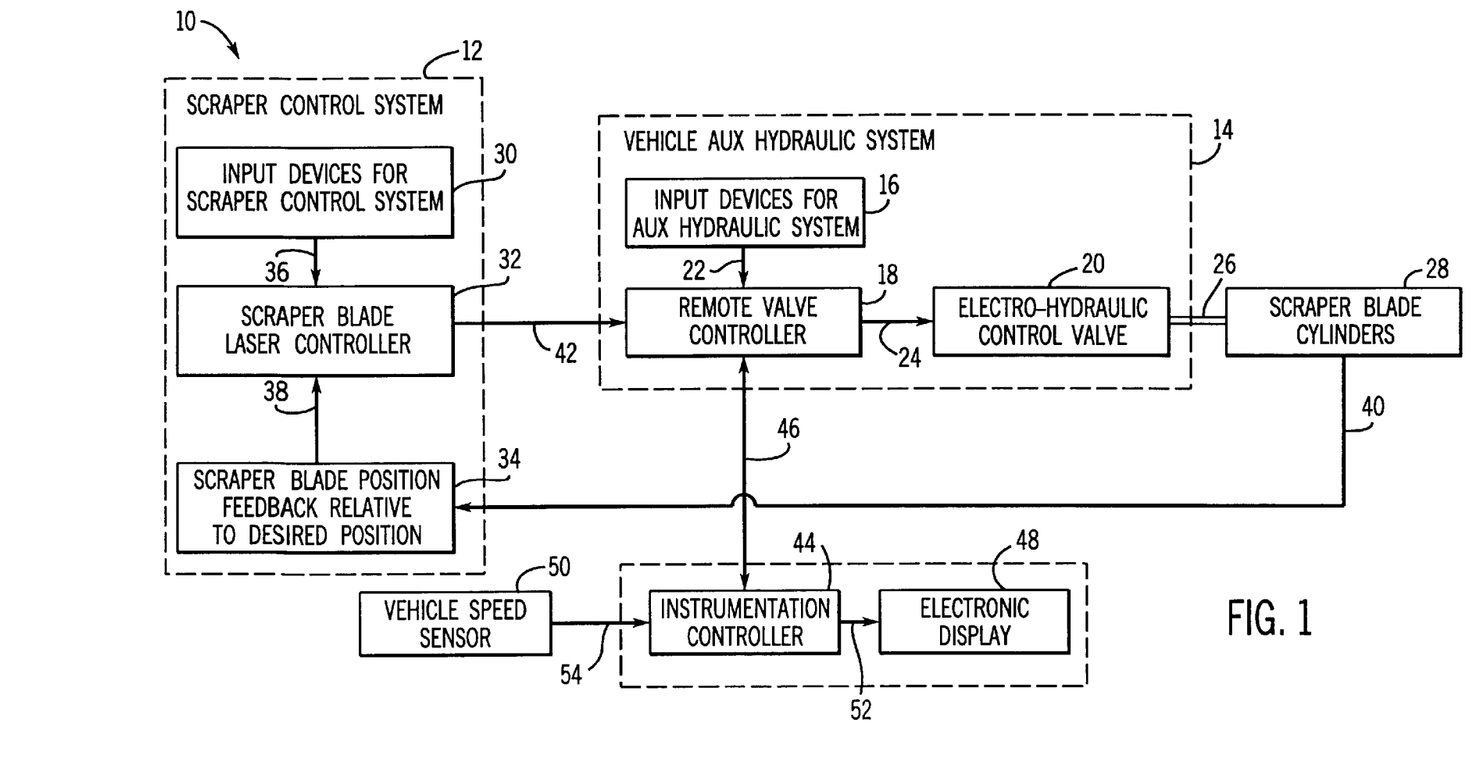
FIG. 1 is a general block diagram representing an integrated laser-guided scraper control system including a scraper control system integrated with the auxiliary hydraulic system of a work vehicle such as an agricultural tractor.

Referring to FIG. 1, an integrated laser-guided scraper control system 10 includes a scraper control system 12 coupled to an auxiliary hydraulic system 14 of a work vehicle (e.g., an agricultural tractor or construction vehicle). Auxiliary hydraulic system 14 includes operator-actuatable input devices 16 located in the cab of the vehicle, an electronic remote valve controller 18, and an electrohydraulic control valve 20. Although only one control valve 20 is shown, system 14 can include multiple control valves 20. Remote valve controller 18 is configured (i.e., programmed) to receive command signals 22 generated by input devices 16 in response to actuations thereof, and generate a valve command signal 24 in response thereto. Valve command signal 24 is applied to control valve 20 to regulate the flow of pressurized hydraulic fluid supplied by the valve through a fluid conduit 26 to an hydraulic actuator 28 (e.g., a hydraulic cylinder or motor) of an implement or attachment coupled to the vehicle. In the example shown in FIG. 1, the implement is a scraper pulled by the vehicle, and actuator 28 includes the hydraulic cylinders which are configured to raise and lower the scraper's blade. It should be understood that other types of implements with other actuator types can be used.

Scraper control system 12 includes input devices 30, an electronic scraper blade laser controller 32, and a scraper blade position error circuit 34. Input devices 30 include both operator-actuatable input devices located in the cab for generating signals 36 representative of operating parameters for the scraper, such as desired grade and elevation information, and a laser for measuring terrain surrounding the vehicle. Scraper blade position error circuit 34 generates a signal 38 representative of the relation between a feedback signal 40 representative of the actual scraper blade position and a desired position of the blade. Scraper blade laser controller 32 is configured (i.e., programmed) to receive the operator-entered grade and elevation signals 36, and the laser signals, from input devices 30, along with scraper blade position relation signal 38 from circuit 34, and generate a control signal 42 therefrom which is applied as an input to remote valve controller 18.

Integrated laser-guided scraper control system 10 also includes an electronic instrumentation controller 44 which communicates with remote valve controller 18 via a bus 46, an electronic display 48 located in the cab, and a vehicle speed sensor 50 such as a wheel or transmission speed sensor, or a ground speed radar. Instrumentation controller 44 is an electronic control unit is configured to generate display control signals 52 to drive display 48 to provide visual indicia to the operator regarding the operation of hydraulic system 14, and is configured to determine the vehicle speed by reading sensed signals 54 generated by sensor 50, and to provide the vehicle speed to the remote valve controller 18 via bus 46.

In a manual operation mode, selected by the operator using one of input devices 16 as described below, auxiliary hydraulic system 14 is configured to ignore control signal 42 provided to system 14 by scraper control system 12. In this mode, remote valve controller 18 generates valve command signal 24 based on command signals 22 received from input devices 16, as determined by the control program being executed. Input devices 16, including an auxiliary valve control lever and a flow limit input knob for setting a flow command and a maximum flow limit for the control valve, are actuated to control the fluid flow being applied to actuator 28. In this manual operation mode, thus, auxiliary hydraulic system 14 operates in much the same manner as the auxiliary hydraulic control system disclosed in U.S. Pat. No. 5,887,669, entitled "Auxiliary Hydraulic Control System", commonly assigned herewith and incorporated by reference herein.

In an automatic operation mode, also selected by the operator using the same input device 16 as that used to select the manual operation mode, auxiliary hydraulic system 14 is configured to generate valve command signal 24 based upon control signal 42 provided to system 14 by scraper control system 12. In this mode, remote valve controller 18 first determines whether either of two conditions exists which causes system 14 to ignore control signal 42 and to control actuator 28 based only on command signals 22 generated by input devices 16. The first condition exists whenever any operator movement of the auxiliary valve control lever (one of input devices 16) is detected by remote valve controller 18. Thus, an operator sitting in the cab can override the automatic and remote control of valve 20 by the implement simply by moving the control lever. When the automatic and remote control is thus overridden, movement of the scraper body caused by changes in the signals output from the laser will not occur. The second condition exists whenever sensed signal 54 generated by speed sensor 50 indicates the vehicle is stationary. By thus ignoring the remote control signal 42, inadvertent movement of the scraper when the vehicle is stationary is prevented. When either of these conditions exist, automatic and remote control will not occur, and actuator 28 can only be controlled manually by the operator using input devices 16.

However, when neither of the above override conditions is present, remote valve controller 18 responds to control signal 42 generated by scraper blade laser controller 32 to generate valve command signal 24. Thus, laser controller 32 can effectively "borrow" the resources of auxiliary hydraulic system 14 to control scraper blade cylinders 28. Laser controller 32 generates control signal 42 based upon sensed laser data, operator-entered grade and elevation data, and feedback data from the scraper blade cylinders 28. When system 14 controls valve 20 based on control signal 42, the position of the scraper's blade is automatically controlled without the need for further operator inputs. The operator can regain manual control of the scraper blade position, thereby overriding the automatic and remote control, simply by moving the valve control lever. Scraper control systems suitable for use with integrated laser-guided scraper control system 10 are commercially available from Spectra Precision, Inc. of Dayton, OH. One scraper control system available from Spectra Precision is identified by model number SCB-21.

Electronic display 48 provides the operator with visual indicia of when control valve 20 is being automatically and remotely controlled by laser controller 32. An exemplary display format is described in relation to FIG. 3.

Integration of scraper control system 12 with auxiliary hydraulic system 14 into scraper control system 10 is advantageous for the vehicle operator and owner as compared to systems wherein the scraper is manually controlled by an operator using the vehicle's auxiliary hydraulic system by itself. These advantages include better scraper control, simplified use, easier setup, less wear and tear on the vehicle hydraulic system, improved productivity, and lower total system costs. Further, scraper control system 10 uses the vehicle's auxiliary hydraulic valves to provide fluid to the scraper, eliminating the need for the scraper to be equipped with these hydraulic valves, thereby significantly decreasing total system costs.

Figure 2:
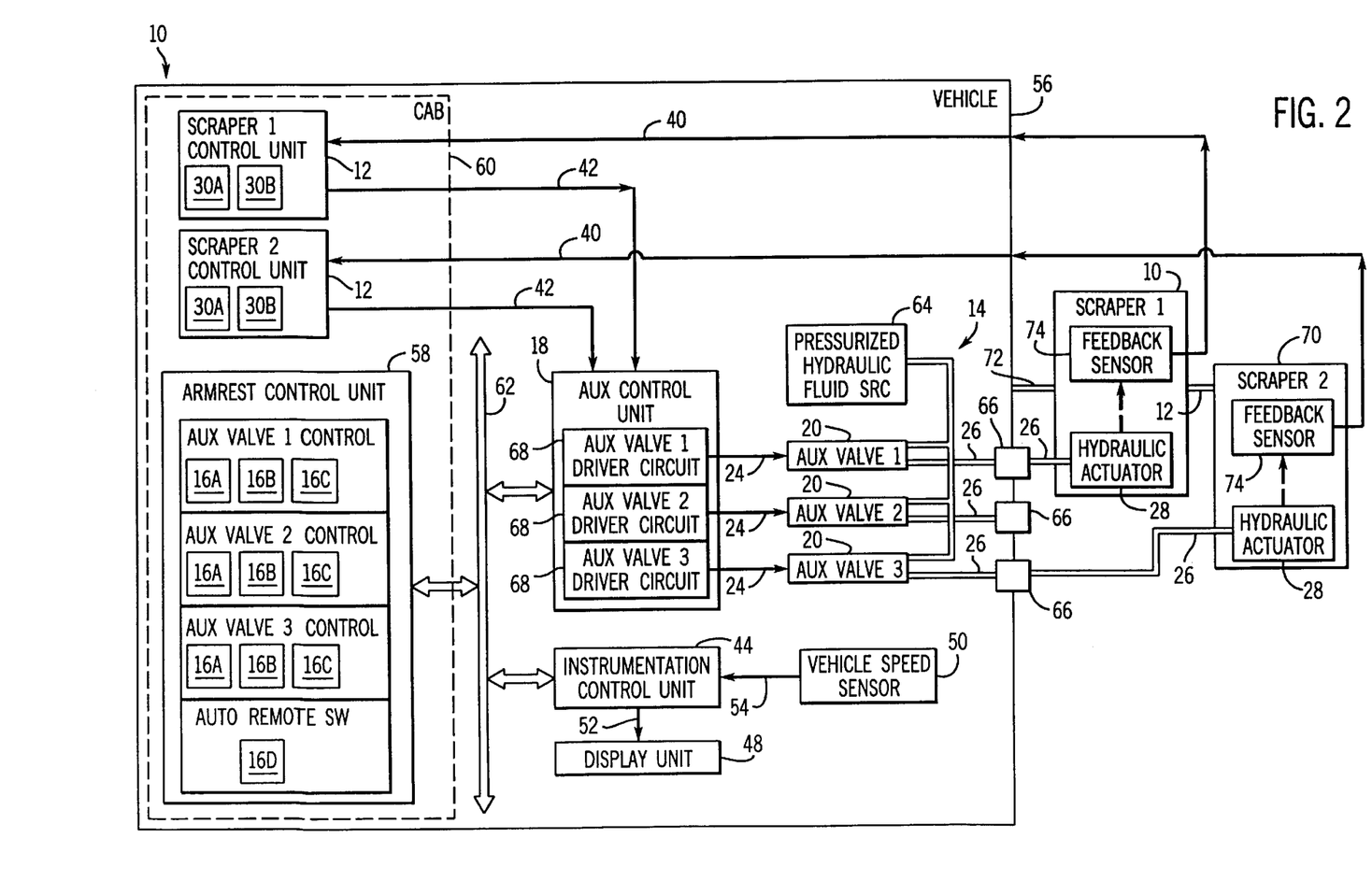
FIG. 2 is a more detailed block diagram representing a laser-guided scraper control system including an armrest control unit and two scraper control units in a cab of the vehicle, an auxiliary hydraulic control system with a plurality of auxiliary valves, and two scraper implements coupled to the work vehicle.

Referring to FIG. 2, scraper control system 10 (shown in further detail) includes two scraper control systems 12 integrated with auxiliary hydraulic system 14 of a work vehicle 56. Auxiliary hydraulic system 14 includes an armrest control unit 58 mounted in a cab 60 of vehicle 56, a vehicle data bus 62, remote valve controller or auxiliary control unit 18, a plurality (e.g., three) of auxiliary valves 20, a source of pressurized hydraulic fluid 64, and three fluid couplers 66 for coupling three attachments or implements thereto. Armrest control unit 58 includes three operator-actuatable input devices for each of the valves: a valve control lever 16A; an automatic kick-out timer disable switch 16B; and a flow limit control knob 16C. Armrest control unit 58 also includes an automatic and remote switch 16D for enabling or disabling the automatic and remote control. The positions and states of input devices 16A–16D are communicated by armrest control unit 58 via data bus 62 to control unit 18. Auxiliary control unit 18 includes a valve driver circuit 68 for generating a valve command signal 24 for each valve 20. Valve driver circuits 68 can be stepper motor driver circuits, as in U.S. Pat. No. 5,887,669, or variable current driver circuits. Control valves 20 control the flow of hydraulic fluid from source 64 to couplers 66 via conduits 26 in response to command signals 24.

In the example of FIG. 2, work vehicle 56 is attached to a pair of scrapers 70 in series by drawbars 72. Each scraper 70 includes a hydraulic cylinder 28 and a feedback sensor 74 for generating a scraper blade position feedback signal 40. Cylinders 28 are each fluidly coupled via a conduit 26 to one of couplers 66 to receive a flow of fluid from auxiliary valves 20, with scraper number "1" coupled to auxiliary valve number "1" and scraper number "2" coupled to auxiliary valve number "3". No implement is coupled to auxiliary valve number "2".

Although FIG. 2 shows a single conduit 26 coupling each implement to vehicle 56, it should be understood that each implement can include multiple hydraulic connections. For example, each scraper 70 can include raise and lower hydraulic connections directed to one of the remote sections (e.g., the two scrapers can each include raise and lower hydraulic connections coupled via appropriate fluid conduits to the respective fluid couplings 66 for the first and third auxiliary valves). It should also be understood that auxiliary hydraulic system 14 may have any number of auxiliary valves, and that any or all of those valves can be used to provide automatic and remote control of an implement, provided that the auxiliary control unit 18 receives a control signal input which is directed to that implement.

Scraper control systems 12 are also mounted in cab 60 of vehicle 56, and each includes a grade input device 30A and an elevation input device 30B to allow the operator to enter desired operating parameters for the operation of its respective scraper. Scraper control systems 12 each receives scraper blade position feedback signal 40 from its respective scraper and each outputs a control signal 42 which is applied as an input to auxiliary control unit 18.

In the manual operation mode selected by the operator by moving automatic and remote switch 16D into a manual position, auxiliary control unit 18 ignores the control signals 42 provided to auxiliary hydraulic system 14 by scraper control systems 12. In this mode, auxiliary control unit 18 generates valve command signals 24 to auxiliary valves 20 based upon the command signals from input devices 16 received from bus 62. The commanded flow is set by valve control levers 16A, with maximum flow limits set by flow limit control knobs 16C.

In the automatic operation mode, selected by the operator by moving automatic and remote switch 16D into an automatic position, auxiliary control unit 18 generates valve command signals 24 based upon control signals 42 provided to auxiliary hydraulic system 14 by scraper control systems 12. Control signal 42 generated by scraper control unit number "1" is used to control a first auxiliary valve 20, and control signal 42 generated by scraper control unit number "2" is used to control a second auxiliary valve 20, provided that neither of the two override conditions described above are present. If, however, operator movement of valve control levers 16A is detected, or vehicle speed signal 54 indicates the vehicle is stationary, then the control signals 42 are ignored as described above.

Figure 3:
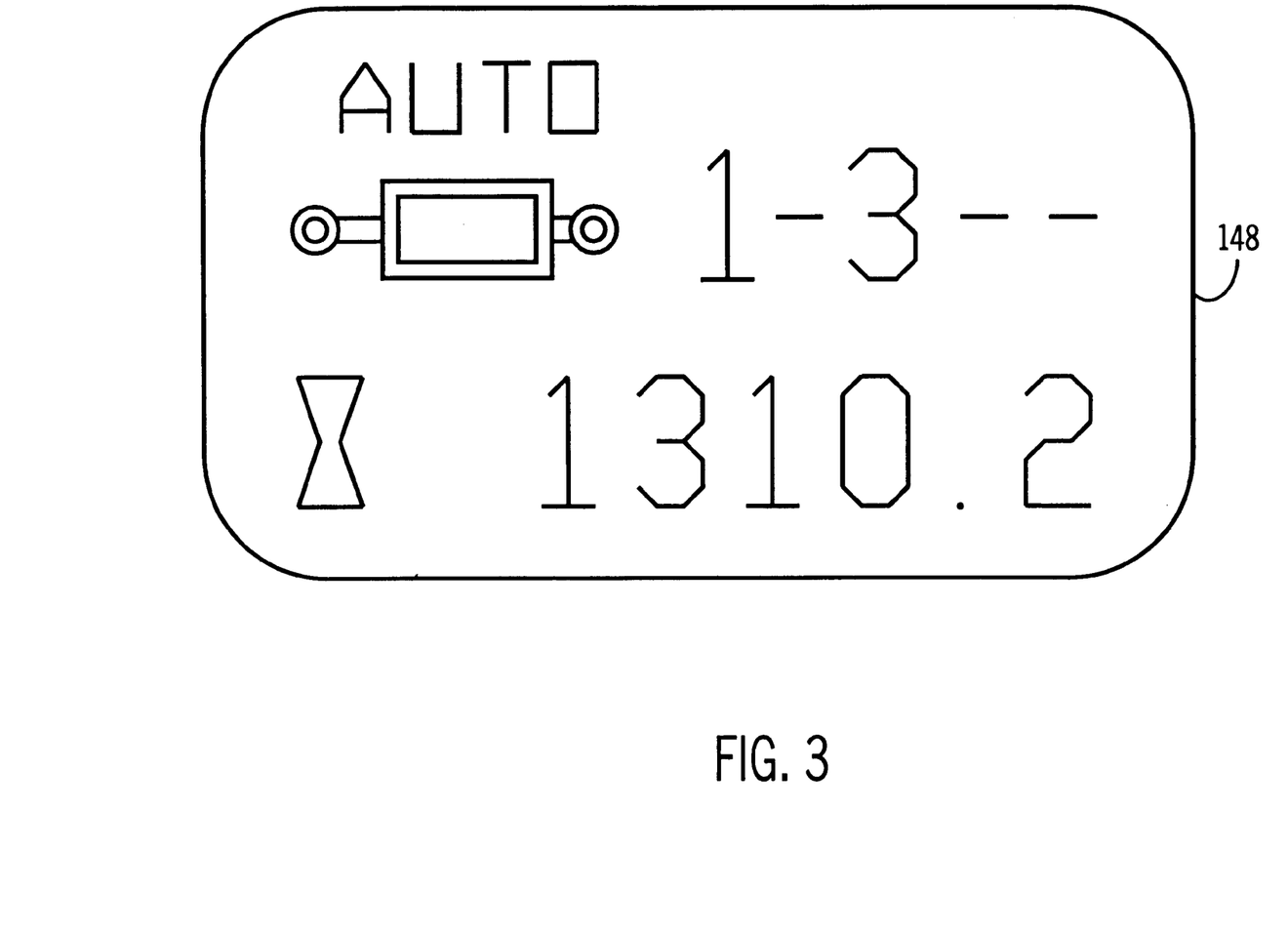
FIG. 3 represents an electronic display providing a visual indication when the implement is remotely and automatically controlling the auxiliary valves, and which valves are being thus controlled (e.g., valve numbers 1 and 3).

Referring to FIG. 3, an exemplary format of the visual indications presented to the operator by electronic display 48 is shown. Display 48 provides a visual indication of when the implement is remotely controlling the auxiliary valves. For example, "AUTO" text is displayed in association with an icon for the auxiliary hydraulic system during the automatic and remote control. The display also shows which auxiliary valves are on and whether the valves are being controlled locally by the control levers in the cab or remotely by the implement (e.g., scraper). For example, in FIG. 2, auxiliary control unit 18 has two analog inputs for receiving analog control signals from controllers of first and second scrapers fluidly coupled to the first and third auxiliary valves. If the operator enables automatic and remote control of auxiliary valves 1 and 3 via automatic and remote switch 16D, display 48 provides visible indicia of "1 - 3 - -" on the display screen to indicate that the first and third auxiliary valves are currently on, and the "AUTO" indicia above the icon of an AUX hydraulic cylinder indicates that the first and third auxiliary valves are being remotely controlled by the implement in the automatic mode. To generate the display shown in FIG. 3, auxiliary control unit 18 generates a request for automatic mode display, which is communicated to instrumentation control unit 44 via bus 62.

Thus, the electronic interface signals between implement control units 12 and auxiliary control unit 18 provides for automatic adjustment of flow to the implements. The interface between armrest control unit 58 and auxiliary control unit 18 provides for enabling and disabling of automatic flows for the implements. The interface between auxiliary control unit 18 and instrumentation control unit 44 provides for displaying operator information of the mode of operation of auxiliary hydraulic system 14 (automatic or manual modes). The instrumentation control unit 44 and its associated operator input devices can also be used to configure the system to operate with one, with two or with some other number of implement controllers.

In one embodiment, auxiliary control unit 18 provides a feedback signal source of 5.0 V, along with a sense line (i.e., analog feedback control signal 42) and a return line, to each implement control 12. The voltage potential between the feedback source and the return line is the "feedback range". Each control 12 provides a signal on the sense line between 0% and 100% of the feedback range. A value of 50% of the feedback range on the sense line is the mid-point flow, and corresponds to zero flow. Values above and below the 50% value correspond to requesting flow from the remote section to extend and retract, respectively, the scraper blade cylinders. The flow to extend the cylinders is linear from 5% to 100% of requested flow for a feedback signal of 54% to 85% of the feedback range, 100% of requested flow for a feedback signal of 85% to 90% of the feedback range, and no flow for a feedback signal above 90%. The flow to retract the cylinders is linear from 5% to 100% of requested flow for a feedback signal of 46% to 15% of the feedback range, 100% of requested flow for a feedback signal of 15% to 10% of the feedback range, and no flow for a feedback signal below 10%. These values are only exemplary and other values and schemes can be used.

In this embodiment, each implement control unit 12 includes an on/off switch providing power to that unit 12, receives a feedback source voltage between 0 and 5.0 V, and a ground, for receiving implement position feedback signal 40, provides an adjustable analog signal ranging from the feedback signal source to ground for use as control signal 42, and can measure the current position of the implement using the feedback signal 40.

In this embodiment, automatic and remote switch 16D is located on the armrest and allows the operator to enable automatic flow adjustment to the implement. Switch 16D is a three-position, momentary-contact rocker switch. A forward/left position of switch 16D enables the first remote section for automatic mode, a center position is open, and a back/right position enables the third remote section for automatic mode. A second activation of switch 16D to either the forward/left or back/right positions disables the automatic mode. Control valve levers 16A are also located on the armrest, and are used in manual mode and to override automatic mode. If the lever is moved from a neutral position whenever automatic mode is active, the remote section reverts back to manual operation and follows the lever command. The automatic mode is then re-entered by placing the lever back into the neutral position while automatic and remote switch 16D is activated. The manual mode is active whenever the automatic mode is not active.

The foregoing description is presented for purposes of explanation and illustration only, and is neither exhaustive nor restrictive. Although only a few exemplary embodiments have been described, the invention is not limited to one particular embodiment. Indeed, to practice the invention in a given context, those skilled in the art may conceive of variants to the embodiments described herein without materially departing from the true spirit and scope of the invention. For example, the vehicle's auxiliary hydraulic system can have different numbers of auxiliary valves, any of which can be capable of being automatically and remotely controlled by an implement controller via a control signal. For another example, while the above description assumed the implement is a scraper coupled to a laser-guided control system, other implements equipped with other hydraulic actuators and controlled by other control units can be used. When interpreted according to the breadth to which they are legally and equitably entitled, the scope of the claims appended hereto and their equivalents embraces all such modifications, variations, substitutions and omissions.

What is claimed is:

1. An auxiliary hydraulic system for a work vehicle, the work vehicle configured to be coupled to an auxiliary implement including a hydraulic actuator and a feedback sensor, the feedback sensor for generating a feedback signal applied to an implement controller, the implement controller configured to generate an automatic command signal, the auxiliary hydraulic system comprising:

a source of pressurized hydraulic fluid;

a fluid coupler configured to be fluidly coupled to the actuator;

an electro-hydraulic control valve fluidly coupled to the hydraulic fluid source and to the fluid coupler, the control valve configured to regulate the flow of fluid between the hydraulic fluid source and the hydraulic actuator in response to a valve command signal;

an operator-actuatable input device for generating a manual command signal;

an operator-actuatable mode device for generating a mode signal; and an auxiliary control unit coupled to the control valve, the input device, the mode device and the implement controller, the auxiliary control unit configured to operate in first and second modes in response to the mode signal, to generate the valve command signal based upon the manual command signal when operating in the first mode and based upon the automatic control signal when operating in the second mode, and to apply the valve command signal to the valve.

2. The auxiliary hydraulic system of claim 1, wherein the work vehicle includes a control console and the input device includes a control lever mounted on the control console.

3. The auxiliary hydraulic system of claim 2, wherein the control lever has first and second ranges of positions, and the auxiliary control unit generates the valve command signal to apply the fluid flow to the actuator in first and second directions when the control lever is moved within the first and second ranges, respectively, when the auxiliary control unit is operating in the first mode.

4. The auxiliary hydraulic system of claim 3, wherein the flow is substantially linearly related to the control lever position in the respective range.

5. The auxiliary hydraulic system of claim 1, wherein the work vehicle is configured to be coupled to a second auxiliary implement including a second hydraulic actuator and a second feedback sensor for generating a second feedback signal to a second implement controller, the second implement controller for generating a second automatic command signal, further comprising a second fluid coupler configured to be coupled to the second hydraulic actuator, a second electro-hydraulic control valve fluidly coupled to the hydraulic fluid source and to the second fluid coupler, the second control valve for regulating the flow of fluid between the hydraulic fluid source and the second hydraulic actuator in response to a second valve command signal, and a second operator-actuatable input device for generating a second manual command signal, the auxiliary control unit also coupled to the second control valve, the second input device and the second implement controller, and the auxiliary control unit also configured to generate the second valve command signal based on the second manual command signal when operating the second implement in a manual mode and based on the second automatic control signal when operating the second implement in an automatic mode, and to apply the second valve command signal to the second control valve.

6. The auxiliary hydraulic system of claim 5, wherein the mode device generates a second mode signal, and the auxiliary control unit operates the second implement in one of the manual mode and the automatic mode in response to actuations of the mode device.

7. The auxiliary hydraulic system of claim 1, wherein the auxiliary control unit is configured to override the automatic control signal when operating in the second mode in response to detected movement of the input device.

8. The auxiliary hydraulic system of claim 7, wherein the auxiliary control unit is configured to override the automatic control signal by generating the valve command signal based on the manual command signal.

9. The auxiliary hydraulic system of claim 1, wherein the input device has a neutral position, and the auxiliary control unit is configured to override the automatic control signal by generating the valve command signal based on the manual command signal in response to the input device being moved from the neutral position when operating in the second mode, and to automatically return to using the automatic control signal in response to the input device being moved back to the neutral position with the mode device still selecting the second mode.

10. The auxiliary hydraulic system of claim 1, further comprising a speed sensor for generating a signal representative of whether the work vehicle is stationary, and the auxiliary control unit is configured to override the automatic control signal when operating in the second mode when the vehicle is stationary.

11. The auxiliary hydraulic system of claim 1, also comprising a display coupled to the auxiliary control unit for providing visual indicia indicative of when the valve command signal is based on the automatic control signal.

12. The auxiliary hydraulic system of claim 11, wherein the display also provides visual indicia of which of a plurality of valve command signals are based upon a respective one of a plurality of automatic control signals.

13. A laser-guided scraper control system for a work vehicle, the work vehicle configured to be coupled to an auxiliary scraper including a hydraulic blade cylinder for raising and lowering a blade and a feedback sensor for generating a feedback signal which is representative of positions of the blade, the laser-guided scraper control system comprising:

a scraper controller for receiving the feedback signal and for generating an automatic command signal at least partly in response thereto; and an auxiliary hydraulic system supported by the vehicle and including a hydraulic fluid source, a fluid coupler configured to be fluidly coupled to the blade cylinder, a control valve fluidly coupled to the fluid source and to the fluid coupler and configured to regulate the fluid flow between the fluid source and the blade cylinder in response to a valve command signal, an operator-actuatable input device for generating a manual command signal, an operator-actuatable mode device for generating a mode signal, and an auxiliary control unit coupled to the control valve, the input device, the mode device and the scraper controller, the auxiliary control unit configured to operate in first and second modes in response to the mode signal, and to generate the valve command signal based on the manual command signal when in the first mode and based upon the automatic control signal when in the second mode, and to apply the valve command signal to the valve.

14. The laser-guided scraper control system of claim 13, wherein the vehicle has a console and the input device is a control lever mounted thereon.

15. The laser-guided scraper control system of claim 14, wherein the control lever has an extend range of positions and a retract range of positions, and the auxiliary control unit generates the valve command signal to apply the flow of fluid to the blade cylinder to extend and retract the blade cylinder when the control lever is moved into positions within the extend and retract ranges, respectively, when the auxiliary control unit is operating in the first mode.

16. The laser-guided scraper control system of claim 15, wherein the flow of fluid is substantially linearly related to the position of the control lever within the respective range.

17. The laser-guided scraper control system of claim 13, wherein the vehicle is configured to be coupled to a second auxiliary scraper including a second scraper blade cylinder and a second feedback sensor for generating a second feedback signal to a second scraper controller, the second scraper controller for generating a second automatic command signal, further comprising a second fluid coupler configured to be coupled to the second scraper blade cylinder, a second control valve fluidly coupled to the fluid source and to the second fluid coupler, the second control valve for regulating the fluid flow between the fluid source and the second scraper blade cylinder in response to a second valve command signal, and a second operator-actuatable input device for generating a second manual command signal, the auxiliary control unit coupled to the second control valve, the second input device and the second scraper controller, the auxiliary control unit configured to generate the second valve command signal based on the second manual command signal when operating the second scraper in a manual mode and based on the second automatic control signal when operating the second scraper in an automatic mode, and to apply the second valve command signal to the second valve.

18. The laser-guided scraper control system of claim 13, wherein the auxiliary control unit is configured to override the automatic control signal when operating in the second mode in response to detected movement of the input device.

19. The laser-guided scraper control system of claim 18, wherein the auxiliary control unit overrides the automatic control signal by generating the valve command signal based on the manual command signal.

20. The laser-guided scraper control system of claim 13, further comprising a speed sensor for generating a signal representative of whether the vehicle is stationary, and the auxiliary control unit overrides the automatic control signal when operating in the second mode when the work vehicle is stationary.

21. The laser-guided scraper control system of claim 13, comprising an operator display coupled to the auxiliary control unit, the display configured to provide visual indicia indicative of whether the valve command signal is based upon the automatic control signal.

22. An auxiliary hydraulic system for a work vehicle, the work vehicle configured to be coupled to an auxiliary implement including a hydraulic actuator and a feedback sensor for generating a feedback signal to an implement controller configured to generate an automatic command signal, comprising:

means for supplying pressurized hydraulic fluid;

means for fluidly coupling the hydraulic actuator to the work vehicle;

valve means for regulating the flow of fluid between the means for supplying pressurized hydraulic fluid and the hydraulic actuator in response to a valve command signal;

input device means for generating a manual command signal;

mode device means for generating a mode signal; and control means for operating in first and second modes in response to the mode signal and for generating the valve command signal based on the manual command signal and automatic command signal when operating in the first and second mode, respectively; and means for applying the valve command signal to the valve means.

23. An auxiliary hydraulic system for a work vehicle, the work vehicle configured to be coupled to an auxiliary implement including a hydraulic actuator and a feedback sensor for generating a feedback signal, comprising:

a source of pressurized hydraulic fluid;

a fluid coupler configured to be fluidly coupled to the actuator;

an electro-hydraulic control valve fluidly coupled to the fluid source and the fluid coupler, and configured to regulate the flow of fluid between the fluid source and the hydraulic actuator in response to a valve command signal;

an operator-actuatable input device for generating a manual command signal; and an auxiliary control unit coupled to the control valve and the input device, the auxiliary control unit being configured to operate in first and second modes to generate the valve command signal, and to apply the valve command signal to the control valve, wherein the valve command signal is based on the manual command signal when operating in the first mode and is based at least partly on the feedback signal when operating in the second mode.

24. The auxiliary hydraulic system of claim 23, wherein the auxiliary control unit operates in the second mode when at least one limit for the feedback signal has been defined.

25. The auxiliary hydraulic system of claim 24, wherein the auxiliary control unit operates in the second mode when at least two limits for the feedback signal have been defined.

26. The auxiliary hydraulic system of claim 23, wherein the auxiliary control unit has a memory circuit for storing an extend limit and a retract limit and the hydraulic actuator is a cylinder capable of being extended and retracted, and the valve command signal is generated based upon the feedback signal, the extend limit and the retract limit in the second mode.

27. The auxiliary hydraulic system of claim 23, further comprising an operator-actuatable automatic and remote switch, wherein the auxiliary control unit operates in the first and the second modes in response to actuations of the automatic and remote switch.

28. An auxiliary hydraulic system for a work vehicle, the work vehicle configured to be coupled to an auxiliary implement including a hydraulic actuator and a feedback sensor, the feedback sensor for generating a feedback signal applied to an implement controller, the implement controller configured to generate an automatic command signal, the auxiliary hydraulic system comprising:

a source of pressurized hydraulic fluid;

a fluid coupler configured to be fluidly coupled to the actuator;

an electro-hydraulic control valve fluidly coupled to the hydraulic fluid source and to the fluid coupler, the control valve configured to regulate the flow of fluid between the hydraulic fluid source and the hydraulic actuator in response to a valve command signal;

an operator-actuatable input lever for generating a manual command signal, the input lever having a neutral position; and an auxiliary control unit coupled to the control valve, the input device, and the implement controller, the auxiliary control unit configured to operate in a manual mode and an automatic mode, the valve command signal being generated based upon the manual command signal when operating in the manual mode and based upon the automatic control signal when operating in the automatic mode, the valve command signal being applied to the control valve;

wherein the auxiliary control unit operates in the automatic mode when the input lever is in the neutral position and, when the input lever is moved from the neutral position when operating in the automatic mode, the auxiliary control unit reverts to generating the valve command signal based upon the manual command signal and, when the input lever is moved back into the neutral position, the auxiliary control unit returns to the automatic mode.

* * * * *